United States Patent
Shah

(10) Patent No.: US 10,905,911 B2
(45) Date of Patent: Feb. 2, 2021

(54) COMPOSITION FOR FIRE EXTINGUISHANT

(71) Applicant: ACHUK ENVIRONMENTAL SOLUTIONS PVT. LTD., Ahmedabad (IN)

(72) Inventor: Rahul Abhaykumar Shah, Ahmedabad (IN)

(73) Assignee: Achuk Environmental Solutions Pvt. Ltd., Ahmedabad (IN)

( * ) Notice: Subject to any disclaimer, the term of this patent is extended or adjusted under 35 U.S.C. 154(b) by 0 days.

(21) Appl. No.: 16/310,389

(22) PCT Filed: Apr. 3, 2017

(86) PCT No.: PCT/IN2017/050126
§ 371 (c)(1),
(2) Date: Dec. 14, 2018

(87) PCT Pub. No.: WO2017/216806
PCT Pub. Date: Dec. 21, 2017

(65) Prior Publication Data
US 2019/0321669 A1    Oct. 24, 2019

(30) Foreign Application Priority Data

Jun. 16, 2016  (IN) .............................. 201621020712

(51) Int. Cl.
A62D 1/00    (2006.01)

(52) U.S. Cl.
CPC .............. *A62D 1/005* (2013.01); *A62D 1/00* (2013.01); *A62D 1/0007* (2013.01); *A62D 1/0014* (2013.01); *A62D 1/0042* (2013.01)

(58) Field of Classification Search
CPC .... A62D 1/005; A62D 1/0007; A62D 1/0014; A62D 1/00; A62D 1/0042
See application file for complete search history.

(56) References Cited

U.S. PATENT DOCUMENTS

| | | | |
|---|---|---|---|
| 3,080,316 A | 3/1963 | Petertyl et al. | |
| 4,042,521 A * | 8/1977 | Dunn | A62C 99/0045 252/5 |
| 5,075,018 A | 12/1991 | Luckanuck | |
| 2002/0055567 A1* | 5/2002 | Romenesko | C08L 2666/02 524/261 |
| 2005/0115721 A1* | 6/2005 | Blau | A62C 13/22 169/5 |
| 2013/0248782 A1* | 9/2013 | Konig | C09K 21/14 252/601 |

FOREIGN PATENT DOCUMENTS

| | | |
|---|---|---|
| JP | S54 81698 | 6/1979 |
| JP | 2003 104769 | 4/2003 |

OTHER PUBLICATIONS

Coal Seam Fire, Wikipedia, https://en.wikipedia.org/wiki/Coal_seam_fire, as archived by the Wayback Machine on Apr. 18, 2016, 8 pages.
"Forest fires may produce as much $CO_2$ as half of all fossil fuels burned," JoNova, http://joannenova.com.au/2015/07/forest-fires-may-produce-as-much-co2-as-half-of-all-fossil-fuels-burned/, Jul. 7, 2015, 47 pages.
International Search Report received in PCT/IN2017/050126, dated Jul. 21, 2017, 3 pages.
Written Opinion received in PCT/IN2017/050126, dated Jul. 21, 2017, 5 pages.
Letter of Acknowledgement, dated Jul. 26, 2019, issued by Government of GOA. 1 page.
*Sonsodo Dumpsite, Goa Fire* video link: https://youtu.be/AD_3jSikJlw, dated Apr. 30, 2020, exemplary screen shots, 1 page.
*Structure Fire test, Finland*: https://drive.google.com/file/d/1KCIPv346vQX0MQjEjmEMBKmfBKTTHE1T/view?usp=sharing, dated May 5, 2020, exemplary screen shots, 1 page.
*Large tyre fire*: https://youtu.be/A0W51edOPkI, dated Nov. 24, 2018, exemplary screen shots, 1 page.
*Dispensation through Fire truck*: https://youtu.be/O3J8kyxhbks, dated Jun. 2018, exemplary screen shots, 1 page.
*Comparative test with water*: https://youtu.be/tMyEtumbkeQ, dated Oct. 2019, exemplary screen shots, 1 page.
*Comparative test with mist*: https://youtu.be/WDNhoI3cMKI, dated Dec. 2019, exemplary screen shots, 1 page.
*Other fire trials*: https://www.youtube.com/watch?v=zVA4ZyIYanE&list=PL42baAV2fotTPkMJqiHnAF5Iim8WC8OHJ, dated Jun. 22, 2017, exemplary screen shots, 1 page.

* cited by examiner

*Primary Examiner* — Andrew J. Oyer
(74) *Attorney, Agent, or Firm* — Klarquist Sparkman, LLP

(57) ABSTRACT

The present composition for extinguishant mainly comprises of composite A and compound B; wherein said Composite A further comprises Compound C or Compound C and e-glass fibre and Compound B is water or deionized water; wherein further, said Compound C is in turn synthetic hydrated calcium silicate of density 60 to 450 kg/m$^3$ preferably 90 to 400 kg/m$^3$; which includes range of Tobermorite, Xenotlite and Wollastonite; said Compound C contains negligible amounts of $Fe_2O_3$MgO and $Al_2O_3$. Said Composite A comprises of 93-96% Compound C and 7-4% e-glass fibre and Compound B is at room temperature. The wet composition of present composition for extinguishant comprises of 2% to 18% W/V of Composite A in Compound B, and dry composition for extinguishant comprises of Composite A:compound B=82-98%:18-2%.

12 Claims, 1 Drawing Sheet

| Comparative Points | Mono Ammonium Phosphate ($NH_4H_2PO_4$) | Water ($H_2O$) | Composition |
|---|---|---|---|
| Toxic Hazard present | ✓ | ✗ | ✗ |
| Visibility issue after use | ✓ | ✗ | ✗ |
| Cleanable after use | ✗ | ✓ | ✓ |
| Reaction with other chemical | ✓ | ✗ | ✗ |
| Harmful emissions on Combustion | ✓ | ✗ | ✗ |
| Eco Friendly | ✗ | ✓ | ✓ |
| Rekindle at high temperature | ✓ | ✓ | ✗ |
| Viscous | ✓ | ✗ | ✗ |
| Bounce back from surface of ignition | ✓ | ✓ | ✗ |
| Corrosive after use | ✓ | ✓ | ✗ |
| Versatile | ✗ | ✓ | ✓ |
| Favorable extinguishing performances | 0/11 | 6/11 | 11/11 |

*(Yes ✓ No ✗)

Table 4: Comparison with prior art

COMPOSITION FOR FIRE EXTINGUISHANT

CROSS REFERENCE TO RELATED APPLICATIONS

This is the U.S. National Stage of International Application No. PCT/IN2017/050126 filed May 3, 2017, which was published in English under PCT Article 21(2), which in turn claims the benefit of India Application No. 201621020712, filed Jun. 16, 2016. Both applications are incorporated herein in their entirety by reference.

FIELD OF INVENTION

The present invention relates to composition for fire extinguishant. In particular, present invention relates to composition for fire extinguishant that extinguishes fire instantaneously and effectively; is safe and easy to use. Moreover, the present composition for fire extinguishant extinguishes the fire with minimized resources and reduced damages on life, property and environment.

BACKGROUND OF THE INVENTION

Fires could be natural or manmade. There are several types of fires including forest fires, coal mine fires, garbage dump site fires etc. i.e. Class A fires. The frequent forest fires which eventually become huge and uncontrollable often happen in dry weather conditions caused by extreme heat due to climate change. For Instance, the cost of fire fighting in forest of California runs into millions of dollars. Altogether the forest fire amounts to half the carbon emissions from human fossil fuel use of 8-10 giga tonnes. According to Joanne Nova, forest fires may produce as much $CO_2$ as half of all fossil fuels burned.

The outcome of all fires is release of heat and destruction of the natural resources. Fire chokes the air with poisonous gases like $CO_2$, $NO$, $SO_2$, $CO$ etc. making it unfit for breathing. Forest fires lead to depletion of oxygen and tremendous increase in levels of carbon dioxide emissions, breaking the cycle of environment thereby cumulating to catastrophic destruction.

Coal mines, forest fires and garbage dump sites present a very big challenge for the 21st century to fight the endless fire rage in many parts of the globe. Fire in coal mines are not controlled since ages due to lack of efficient extinguishant. Coal mine fires are also the major contributor to carbon dioxide and other harmful emissions. Due to coal mine fires, revenue losses have reached gigantic proportions. For Instance, India's Jharia Coal field has been burning for 100 years. According to a report by Robert Ferris (science Reporter) from CNBC, fire in Jharia coal mines alone have caused losses of around 220 billion dollars. Coal mine fires contribute 3% carbon dioxide and hazardous gases of the total emissions of the globe annually.

Fire in areas containing gas or chemicals, oils, liquid fuels, electric panels, bring devastation to human life. So fires are the major cause of destruction throughout the globe and much more needs to be done to reduce the impact of fires on the ecosystem of the living globe.

Analytical Data for fire hazards and pollution is being prepared on a global scale by lots of scientist. The leaders of the world are gravely concerned about the global warming. Since fire leads to release of $CO_2$ and at the same time $O_2$ is consumed, this exponentially increases global warming.

Extinguishing different type's of fire requires different kinds of extinguishants. Said extinguishants are generally sprinkled on fire to extinguish it. Most of the available fire extinguishants have slow extinguishing capability which causes difficulty in extinguishing fire instantly and leads to stress and fatigue to the fire fighters.

PRIOR ART

Prevalent Fire Extinguishants.

Water is one of the most commonly available fire extinguishants and is widely known and used. The density of water at 20° C. is 998.2 kg/m³. Water evaporates above 100° C. pH of water is 7 and pH of distilled/deionised water can get as low as 5.5. Viscosity of water is 1 centipose. Water has inherent tendency to spill off the ignition surface so more water is required to cool down the fire. Thus, for continuous fire fighting large volume of water is required. In addition, more the water used more steam is produced which results in risk of burns and flooding.

Moreover, when there is inadequate amount of water, fire rekindles and results in more destruction. There is a risk of life in such situations.

For controlling fires, static infrastructures such as hydrants and underground storage water tanks are being used at various places. These arrangements may not be available at all places. Further, such arrangements are expensive. In addition, availability of water and maintaining required amount of water may not be feasible at all places for a given time. Moreover, water scarcity is a predominant issue. Using abundant water for extinguishing fires may further diminish available water resources. Other options include mobile fire tender. However, bottlenecks in Roads, traffic and connectivity can cause delay in fire tenders reaching the fire location. Fire tenders also require vacant area which may not be adequate in many situations. Use of merely water as extinguishant has high logistics issues. Other options include air tractors which include helicopter and planes to sprinkle water on large fires. This requires bringing of abundant water from available resources and sprinkling on the fire from height. However, when mere water is used as fire extinguishant, it incurs exorbitant costs and has logistic issues.

Thus, mere use of water as extinguishant is neither efficient nor cost effective.

Mono Ammonium Phosphate (MAP)

Mono ammonium phosphate (MAP) is a common commercially available chemical fire extinguishant predominantly used throughout the world since last more than 50 years. There have been various research and developments on the chemical to improve the effectiveness of performance.

MAP melts at 190° C. and makes a thin film on combusting surface. So it takes more time to act and extinguish the fire. In addition, due to the spherical shape of the granules of MAP, the granules may roll away from the combusting surface. They roll away due to wind. This results in failure to achieve effectiveness of the amount of MAP used. In addition, it emits harmful gases unfit for breathing and results in suffocation and panic. It produces excessive smoke and odour during combustion, and hampers visibility. Mono ammonium phosphate (MAP) has pH of 4-5 and is partially soluble in water. This leads to contamination of soil and water that results in disturbing the ecosystem. Hence it is not environment friendly. Thus, this chemical extinguishant is neither efficient nor safe.

Further, in case of medium and large fires the weight of the extinguisher poses limitation to the user. MAP has a density of about 960 kg/m³, the large sized extinguishers are very heavy to carry or to transport. For large fires, expert and skilled firemen become a critical requirement and it may take time for them to reach the place of fire. Many times it is too late to reach the place despite honest and speedy action by firemen. This makes it difficult and cumbersome to use.

Furthermore, once the fire is extinguished, there are high cleaning issues when MAP is used as extinguishant.

Scientist, Leaders of the world, UN, WHO, IPCC, many climate change communities and people at large are having a major concern for fighting fire and reducing carbon dioxide and toxic emissions.

This has lead to various developments in the field by different inventors. There are various patent documents disclosing the use of specific fire extinguishants. Relevant prior arts are listed herein below with their details:

U.S. Pat. No. 4,042,521 describe a "fire extinguishing composition" which relates to a dry fire extinguishant particularly useful for class B fires. Fire extinguishing composition is capable to generate more carbon dioxide by heat decomposition. The composition contains metal bicarbonates, desiccants, lubricants and precipitated calcium silicate. It uses flame actuated sensor or pyrotechnic wire attached to cooking range hood as specified tool to deliver. (Page No 9 line no 12 to 22) mentions that with more use of precipitated calcium silicates the effect of main compound $NaHCO_3$ for performance decreases. However, said invention claims the use of metal carbonates that results in release of hazardous gases. Also, the invention restricts the extinction of fires to class B i.e. cooking and kitchen fires. It requires special tools, techniques and fitments to achieve the results claimed; making the invention complex and exclusive for class B fires and fails to indicate any teaching to use the same for other types of fires. Moreover, said document fail to provide and teach a safe and eco-friendly fire extinguishant that extinguishes fire efficiently and promptly.

Moreover the said document fails to clearly mention the advantages of precipitated calcium silicate. Moreover the inventions previously mentions the disadvantage of the prior art like release of the toxic gases. However the said document claims to release $CO_2$ to extinguish fire which is also a harmful gas.

U.S. Pat. No. 5,075,018 describes "Dry fire extinguishing composition and product" which relates to a dry fire extinguishing composition product which is completely inorganic and powered by nitrogen used for class A, B, C fires. Fire extinguishing composition is made of alumina trihydrates and wollastonite. Wollastonite is calcium metasilicate ($CaSiO_3$). The 325 mesh particle size of wollastonite knocks out fire initially and then aluminium trihydrate smoother the fire. However the calcium metasilicate is the Wollastonite of Nyad G. 325 mesh which is a natural mineral of high density of 2899.34 $kg/m^3$ and very low BET surface area of 1.5 $m^2/gm$. (CAS no.13983-17-0). Said natural mineral wollastonite when heated releases acrid smokes and fumes. Hence, the prior art fails to provide safe and eco friendly fire extinguishant that extinguishes fire efficiently and promptly.

U.S. Pat. No. 3,080,316 describes "Fire retardant and control composition" relates to preparation for a method of retarding and controlling fires and is particularly directed to a novel combination which produces an adhering, liquid retaining, smothering and insulating blanket. The fire retarding and control composition, blankets or coats by adhering tenaciously upon contact to any surface. The composition contains Calcium, magnesium silicates, diatomaceous earth, certain clays or the like, Methylcellulose, Asbestos, Sodium Naphthalene Sulfonate Formaldehyde, and Bentonite. However, the composition contains harmful and banned chemicals such as asbestos thereby failing to teach any composition for fire extinguishant that is safe and eco-friendly. Also, the composition is too complex. It results in release of acids smokes and irritating fumes. Moreover, the composition requires cumbersome cleaning after fire. The invention disclosed in said document attempts to contain heat by adhering insulation and smothering blanket or coating which does not boil, bubble or spall exposing any underlying combustible surface and brought to the dull red heat. Moreover it does not attempt to eliminate fire but keep the heat contained in the combusting materials, there by resulting in failure to prevent damages and destruction as a fire extinguisher.

Thus, there is a long felt need to develop a composition for fire extinguishant which extinguishes fire instantaneously and is safe and easy to use and obviates the problems of the prevalent extinguishants.

Disadvantages of the Prior Art

Above mentioned prior arts suffer from at least one of the following disadvantages:

They fail to extinguish fire instantaneously.

They have a high risk of rekindling fire.

They cause pollution by emitting hazardous gases and smoke.

Smoke emissions from extinguishant also pose breathing problems.

Visibility is hampered in continued fire fighting and can be very ineffective for the fire fighting operators who risk their lives to save people trapped inside the fire.

They require huge amounts of extinguishants or water.

They are not efficient in extinguishing large fires.

They lose their extinguishing property at higher temperatures.

Most of them fail to extinguish large fire, as they are affected by heat and get burnt out on the combusting surface.

The extinguishers with such extinguishants are difficult to use.

The shelf life of such extinguishants is limited.

There have considerably high logistic issues.

They require trained personals for fire fighting.

They have low performances. Slow extinguishing capability of extinguishant cause difficulty in extinguishing fire instantly, this causes stress and fatigue to the fire fighters.

The create odour on combustion.

They cause considerable damage to the assets.

The extinguishers to carry such extinguishants are heavy since the extinguishants are filled up with pressure and thus the extinguishers are to be made out of thick walled metal containers to resist such pressure. It is not portable enough for effective use by all.

Many of the extinguishants require advanced extinguishers; which are very costly for large scale use.

They have cleanability issues after use.

Many of them are acidic in nature and are partially or fully soluble in water. This leads to contamination of soil and water that results in disturbing the ecosystem.

They are not environment friendly.

Some of them contain carcinogens such as asbestos or halon or others.

Most of them are heavy and it is logistically challenging to reach the adequate amount at the site of fire.

Inadequate capacity of fire extinguishing agents to extinguish large fire leads to significantly higher amount of use of fire extinguishants.

Excessive use of fire extinguishants leads to exponentially higher problems like smoke, flooding, and destruction of property.

None of them are efficient in extinguishing fire.

Thus, there is a long felt need to develop a composition for fire extinguishant which extinguishes fire instantaneously and is safe and easy to use and obviates the problems of the prevalent extinguishants.

OBJECTIVES OF THE INVENTION

The main objective of the present invention is to provide composition for fire extinguishant which extinguishes fire instantaneously and is safe and easy to use.

Another object of the present invention is to provide composition for fire extinguishant which retards rekindling of fire.

Yet another objective of the present invention is to provide composition for fire extinguishant which eliminates the use of excessive amounts of water thereby facilitating to save water.

Yet another object of the present invention is to provide composition for fire extinguishant which eliminates the emissions of harmful gases and smoke hazards thereby eliminating the risk of pollution and vision hampering, further making it safe to use.

Yet another object of the present invention is to provide composition for fire extinguishant which eliminates the risks of breathing problems.

Yet another object of the present invention is to provide composition for fire extinguishant which is not affected by fire till very high temperatures up to 1540° C., so the composition performs efficiently even in case of extreme fires.

Yet another object of the present invention is to provide composition for fire extinguishant which is efficient in extinguishing large fires like forest and coal mines and save precious natural resources.

Yet another object of the present invention is to provide composition for fire extinguishant which considerably reduces the logistic issues.

Yet another object of the present invention is to provide composition for fire extinguishant which reduces risk of fire injuries, Life and property.

Yet another object of the present invention is to provide composition for fire extinguishant which reduces damage to the assets.

Yet another object of the present invention is to provide composition for fire extinguishant which is light in weight and does not require filling with very high pressures and thus the extinguishers filled with it are light in weight and thus easy to carry.

Yet another object of the present invention is to provide composition for fire extinguishant which eliminates the risk of stress and fatigue to the fire fighters.

Yet another object of the present invention is to provide composition for fire extinguishant which requires limited fire tenders, manpower and other resources for extinguishing fire.

Yet another object of the present invention is to provide composition for fire extinguishant which is cost effective.

Yet another object of the present invention is to provide composition for fire extinguishant which is not viscous and is easy to clean after use.

Yet another object of the present invention is to provide composition for fire extinguishant which is Neutral to pH scale.

Yet another object of the present invention is to provide composition for fire extinguishant which does not release bad odour in presence of high temperature fire.

Yet another object of the present invention is to provide composition for fire extinguishant which does not contain any carcinogens.

Yet another object of the present invention is to provide composition for fire extinguishant which enhances performance and uses less amount of extinguishant.

Yet another object of the present invention is to provide composition for fire extinguishant which is easy to carry and use with existing tools and technology. It is also possible to spray or release the composition from air tractors (helicopters, planes) or drones.

BRIEF DESCRIPTION OF THE DRAWING

FIG. 1 is a table comparing properties of the disclosed composition to properties of mono ammonium phosphate ($NH_4H_2PO_4$) and water.

DETAILED DESCRIPTION OF THE INVENTION

The embodiment of the present invention is to provide composition for fire extinguishant which extinguishes fire instantaneously and is safe and easy to use.

The present composition for extinguishant mainly comprises of composite A and compound B; wherein said composite A further comprises compound C or compound C and e-glass fibre and Compound B is water or deionised water.

Said compound C is in turn synthetic hydrated calcium silicate of density 60 to 450 kg/m$^3$ preferably 90 to 400 kg/m$^3$; which includes range of Tobermorite, Xenotlite and Wollastonite. The Said compound C or Synthetic hydrated Calcium silicate contains negligible amounts of $Fe_2O_3$, MgO and $Al_2O_3$.

The said e-glass fibre is having a bulk density of 252 kg/m$^3$ preferably 262 kg/m$^3$.

Said Composite A comprises of 93-96% Compound C and 4-7% e-glass fibre, and the said Compound B is at room temperature.

The wet composition for present extinguishant comprises of 2% to 18% W/V of Composite A in Compound B, and dry composition for extinguishant comprises of composite A and compound B in the following ratio:

Composite A:compound B=82-98%: 18-2%.

Said compound C has the following molecular formula, $Ca(OH)_2SiO_2$ with negligible amount of impurities of $Al_2O_3$,$Fe_2O_3$,MgO. Having molecular weight of 134.18 gm/mole.

Present composition for extinguishant can be sprayed by normal hand pressured pumps for delivery at shorter distance of about 6 to 15 feet. Present composition for extinguishant has efficient deliverability when dispersed with the compressed nitrogen gas using standard fire extinguishers.

A sample was selected from the above range wherein the sample containing 3% W/V of Composite A having density of 270 kg/m$^3$ in Compound B at room temperature. Various tests were performed using said sample to establish its properties and effectiveness.

The properties of composite A as obtained from said tests are described herein below table:

TABLE 1

Properties of composite A

| Sr. No. | Properties | Performance | Value | Units |
|---|---|---|---|---|
| 1 | Thermal conductivity | Low | 0.045 | W/m° K |
| 2 | Thermal Resistance | Excellent | 22.22 | m° K/W |
| 3 | Melting Point | High | 1540 | ° C. |
| 4 | Flammable | Non flammable up to | 1800 | ° C. |
| 5 | Stability | Stable up to | 1540 | ° C. |
| 6 | Solubility in water | Negligible | 0.01 | % |
| 7 | Adsorption of Water | High | 240 | % |
| 8 | pH | alkaline (Inert) | 9 | |
| 9 | Size of particle | Fine | <72 | µ |
| 10 | Particle size Distribution | d10 | 3.30 | µ |
|  |  | d50 | 15.0 |  |
|  |  | d90 | 51.0 |  |
| 11 | BET surface area |  | 41.6387 | $m^2/gm$ |
| 12 | BJH adsorption |  | 27.0787 | $m^2/gm$ |
|  | BJH desorption |  | 25.6555 | $m^2/gm$ |
| 13 | Density | Light weight | 270 | $kg/m^3$ |
| 14 | Stains | Stain free | 95% |  |
|  | Colour | Off White |  |  |
| 15 | Smell | Odourless |  |  |
| 16 | Acid | Acid free |  |  |
| 17 | Asbestos content | NIL |  |  |
| 18 | Carcinogenic content | NIL |  |  |
| 19 | Irritation to eyes and skin | Low |  |  |

Above table 1 shows various properties of composite A. The relevance of the values of the properties shall be brought about in the description followed herein below.

The present composite A has low thermal conductivity 0.045 W/m° K and higher thermal resistance 22.22 m° K/W that does not permit the fire to rekindle.

The melting point of composite A is 1540° C. and it is not flammable till 1800° C. making it stable and effective even against large fires that result in high temperatures. The composite A is inert and almost insoluble (0.01%) in water hence it does not react with water ensuring its high stability and permanent shelf life.

This makes the present extinguishant substantially efficient. It can be stored, transported and used efficiently. Moreover, composite A does not dissolve in water, hence it does not contaminate soil and water; making it eco friendly; thereby overcoming the problems of the prior art.

Particle size of Composite A is very small i.e. is less than 72 micron (particle size distribution of d10, d50, d90 is 3.30, 15.51 micron respectively), that makes it lighter in weight. Thus, it can be easily stored and safely transported. The particles of Composite A have high surface area coverage (BET 41.6387 $m^2/gm$), high adsorption (BJH 27.078 $m^2/gm$) and desorption (BJH 25.655 $m^2/gm$), so it adheres to the combusting surface like a thin layer and spreads along with the adsorbed water. Composite A has density up to 270 $kg/m^3$. It has more surface area that enables it to hold more Compound B on its porous surface. Composite A adsorbs 240% compound B (adsorbed water) of its weight facilitating in extinguishing fire.

The e-glass fibre particles in composite A have a softening temperature of 830° C. to 916° C. and liquefy at 1070° C. to 1200° C. e-Glass fibre is inert. The e-glass fibre particles adhere to the compound C particles at higher temperature. Molten e-Glass fibre particles fuse and reduce the rate of heat conduction and act as barrier against release of volatile gases.

In addition, the composite A contains 14% fused (chemically combined) water compound B which releases at high temperature further aiding in fire extinguishing.

The composite A has pH 9 and is thus not acidic unlike the prior art thereby ensuring that there is no damage to the assets while its use. There are also no issues of cleanability after using present fire extinguishant. Moreover the properties of compound like stain resistance, white colour, odourless, acid free, non asbestos and non carcinogenic makes it eco friendly.

For extinguishing fire with present extinguishant, composite A is sprayed along with compound B based on the type of fire. The above mentioned properties of composite A are also able to give substantial effectiveness in presence of compound B wherein, following properties of compound B plays an important role:

The properties of compound B are:

TABLE 2

Properties of Compound B

| Sr. No. | Properties | Performance | Value | Units |
|---|---|---|---|---|
| 1 | Specific heat | — | 1 | calorie/gm° C. |
| 2 | Latent heat of vaporisation | — | 542 | calorie/gm |
| 3 | Boiling point | — | 100 | ° C. |
| 4 | Viscosity | Viscous | 1 | Centipoise @ 20° C. |
| 5 | pH | Neutral | 7 |  |
| 6 | Density | Heavy | 998.2 | $kg/m^3$ |
| 7 | Stains | Stain free |  |  |
|  | Colour | Colourless |  |  |
| 8 | Smell | Odourless |  |  |
| 9 | Acid | Acid free |  |  |
| 10 | Asbestos content | NIL |  |  |
| 11 | Carcinogenic content | NIL |  |  |
| 12 | Irritation to eyes and skin | NIL |  |  |

Compound B has a specific heat of 1 calorie/gm° C. and latent heat of vaporisation of 542 calorie/gm, this helps compound B to absorb heat instantly and it vaporises quickly. Compound B boils at 100° C. which makes it an appropriate compound to change the phase from liquid to vapour in minimum time. This ensures rapid heat transfer and change of state from liquid to vapour thereby cooling off the combusting surface and pushing away oxygen instantly. Compound B has viscosity of 1 centipose making it appropriate to deliver. Compound B has neutral pH 7 hence it is environmental friendly. The density of compound B is 998.2 $kg/m^3$.

As it is stain free, colourless, odourless, acid free, non-carcinogenic and without any hazardous substances, it does not impart any adverse effect on environment.

Composite A and compound B when combine, while dispersing results in present composition for fire extinguishant. Said Composite A and compound B are inert and so they do not react, composite A is almost insoluble in compound B.

| ANALYSIS OF A DROP OF PRESENT COMPOSITION FOR FIRE EXTINGUISHANT | |
|---|---|
| Density of Composite A in the drop | 0.27 $gm/cm^3$ |
| Quantity of mixture | 1 ml |
| Drops per ml | 16 |

-continued

| ANALYSIS OF A DROP OF PRESENT COMPOSITION FOR FIRE EXTINGUISHANT | |
|---|---|
| Weight of Composite A in 1 ml of composition | 0.0300 gm |
| Surface area covered by each drop of composition | 3.977697 cm$^2$ |
| Quantity of Composite A in each drop of 3% composition | 0.001875 gm |
| Density | =Mass/Volume |
| Hence thickness | =Mass/area × Density |
| Thickness | 0.001745 cm or 17.45 μm |
| BJH adsorption cumulative surface area of pores | 27.0787 m$^2$/gm |
| BJH adsorption cumulative surface area of pores available per drop | 0.050733 m$^2$ (507.72 cm$^2$) |
| BET surface (appendix A) | 42 m$^2$/gm |
| BET surface available per drop | 0.07875 m$^2$ (787.5 cm$^2$) |

From the above table it is observed that the BET surface area of particles concentrated in the drop area is 787.5 cm$^2$ for each drop of 16 drops per ml. Drop sizes were of 22.5 mm diameter which is 3.5 cm$^2$ approx. Due to the low density and high surface area of particles of present composition, multilayer densification of particle is occurring per drop area. The diffusion of the compound B from composite A on the surface of the combustion spreads the fine particles of Composite A over the surface of the combustion. The composite A trapped in the multilayer formation loses compound B by vaporisation in presence of fire. Due to the vaporisation of compound B the particle stick to each other creating a thin but strong mesh of particles covering the surface.

Working of Present Invention

The particles of Composite A reach the surface of object in fire with compound B. The Composite A adheres to the combusting surface due to its low density and fine particle size less than 72 microns. The BET surface and the BJH adsorption property of Composite A enables to adsorb 240% of Compound B by weight. However, Composite A also has good desorption property in presence of Heat on combusting surface, due to which the present composition releases Compound B effectively and Compound B vaporises at 100° C. and pushes the oxygen upwards. In addition, the unadsorbed Compound B (carrier water) also facilitates in extinguishing fire, which also evaporate with increasing temperature. Moreover, at higher temperatures, the fused water is also released from said composite A. The adsorbed water, carrier water and fused water play synergistic performance while extinguishing fire.

Said sample comprises of 30 gm of composite A in 1000 ml of compound B wherein it contains:
  4.65 gm of fused water,
  72 gm of adsorbed water,
  928 gm is the carrier water.
Wherein further the adsorbed and carrier water has a high degree of cohesion.

The latent heat of vaporisation of Compound B (542 calorie/gm) helps to absorb heat instantly and vaporise quickly. The high temperature resistance of the particles of Composite A ensure the particles of the composite A to remain unaffected by fire upto 1540° C. Particles of Composite A densify as a thin layer thereby cutting off the oxygen supply.

The combined effect of the Composite A and Compound B cools the heat, pushes oxygen away from the combusting surface and blocks further connectivity of oxygen to the surface of combustion. The Composite A also prevents heat to reach the covered surface so that fire does not rekindle. This makes the present composition substantially efficient fire extinguishing agent in comparison to all the prior arts.

The fine particle size below 72 micron and high temperature resistance of 1540° C. of Composite A fuse to the surface of the molten solids in combustion, thereby cutting off oxygen. The light weight of composite A with density of 270 kg/m$^3$ covers the surface of the liquid in fire and cuts off oxygen by creating a thick layer and float on it for a considerable time.

Delivery Mechanisms of Present Extinguishant

The present composition for fire extinguishant extinguishes most kinds of fire and is deliverable through existing fire extinguishers such as listed herein below but not limiting to said fire extinguishers:
  a) Wet Type Extinguisher
  b) Dry Type Extinguisher
  c) Fire tender with Composition tank connected to hose pipe through a venture of 1:5
  d) Dry (Sand) Blaster used as sprayers
  e) Wet Blaster used as sprayers
  f) Fire Fighting planes, drones, helicopters
  g) Tenders and hydrants It was observed that apart from the existing extinguishers Dry (Sand) Blaster and Wet Blaster are used as sprayers to spray present composition as fire extinguishant.

Following table shows the use of present composition for fire extinguishant through above-said fire extinguishers. It particularly shows the composition used and the methods used in extinguishing fire.

TABLE 3 shows the use of present composition for fire extinguishant through above-said fire extinguishers.

| Sr. No. | Description of Fire | Composition Used | Delivery Mechanism | Method of Delivery |
|---|---|---|---|---|
| 1 | Type A Fires Small/Medium (Wood/Cloth/Grass etc.) | 3% W/V Composition | Standard Wet Type Extinguisher | Fill the 3% W/V composition at 15 bar nitrogen pressure and deliver on the fire site. |
| | | 100% Composite A, Compound B | Standard Dry Type Extinguisher | Fill the 100% Composite A at 15 bar nitrogen pressure. Disperse the Composite A followed by a spray of compound B. |

TABLE 3-continued shows the use of present composition for fire extinguishant through above-said fire extinguishers.

| Sr. No. | Description of Fire | Composition Used | Delivery Mechanism | Method of Delivery |
|---|---|---|---|---|
| 2 | Large Type A Fires (Forest/Coal Mine Fires) | 100% Composite A, Compound B | Dry (Sand) blaster | Fill the 100% Composite A. Disperse the Composite A followed by a spray of compound B. |
| | | | Dry (Sand) blaster, fire hydrant/fire tender. | Disperse the Composite A through a dry (sand) blaster followed by compound B dispersed by a fire hydrant or tender. |
| | | | Dry (Sand) blaster, Wet Blaster. | Disperse the Composite A through a dry (sand) blaster followed by compound B dispersed by a wet blaster. |
| | | 100% Composite A, Compound B | Fire Fighting planes, drones, helicopters | Air drop 100% Composite A through planes, drones or helicopters; followed by sprinkling Compound B through the most convenient mechanism - Fire hydrants/air drop. |
| | | 3% W/V Composition | Fire Fighting planes, drones, helicopters | Air drop 3% W/V composition through fire fighting planes, drones or helicopters. |
| | | 18% W/V Composition | Tank with venturi of 1:5 connected to hose pipe | Tank contains 18% W/V Composition. Connect this tank with the hose pipe from the fire tender, through a venturi 1:5. The dispersed composition will be 3% W/V Composition. |
| 3 | Gas Fires | 18% W/V Composition | Wet Blaster | Disperse 18% W/V Composition with a wet blaster |
| 4 | Small Liquid Fires | 100% Composite A, Compound B | Standard Dry Type Extinguisher | Fill the 100% Composite A at medium to low pressure in a standard Dry Type extinguisher. Disperse the Composite A over the surface of liquid fire. Use Compound B Mist for elimination of fire source. |
| 5 | Electric Fires | 100% Composite A, Compound B | Standard Dry Type Extinguisher | Fill the 100% Composite A at medium to low pressure in a standard Dry Type extinguisher. Disperse the Composite A on the electric panels or equipments on fire followed spray of Compound B (preferably deionised water mist). |
| | | 3% W/V Composition (Using Deionised water) | Standard Wet Type Extinguisher | Fill the 3% W/V composition (where Compound B contains deionised water) at 15 bar nitrogen pressure and deliver on the fire site. |
| 6 | Kitchen Fires | 100% Composite A, Compound B | Standard Dry Type Extinguisher | Fill the 100% Composite A at medium to low pressure in a standard Dry Type extinguisher. Disperse the Composite A followed by spray of Compound B (mist) to eliminate fire source. |
| 7 | Solid Fires | 100% Composite A | Standard Dry Type Extinguisher | Fill the 100% Composite A at medium to low pressure in a standard Dry Type extinguisher. Disperse the Composite A followed by spray of Compound B mist to eliminate fire source. |

Comparison with Prior Art

The present composition for fire extinguishant is compared with commonly used fire extinguishants as shown in table 4 (FIG. 1).

The table 4 shows the advantages of present composition for fire extinguishant in comparison to commonly used fire extinguishants i.e Mono ammonium phosphate and water used.

Advantages of the Present Invention

The present invention is advantageous in the following manner:

Quick eliminations of fire reduces the efforts for extinguishment.

The cost and capital expenditure for fire fighting will be curtailed and fire fighting will be enhanced by rapid action performance.

It is Insoluble in water and poses no hazard threat to air, water or soil.

The present invention provides composition for fire extinguishant which extinguishes fire instantaneously and is safe and easy to use.

It eliminates the use of excessive amounts of water thereby facilitating to save water, the extinguishant can extinguish the large fires which otherwise reach uncontrollable scales in the areas where there is scarcity of water.

It is Light weight thereby making fire fighting easy in using products in various capacities.

It prevents rekindling of fire.

It eliminates the emissions of harmful gases and smoke hazards thereby eliminating the risk of pollution, vision hampering and breathing problems further making it safer to use and does not cause breathing problem.

It has prolonged shelf life.

It is not affected by fire till very high temperatures (1540° C.) so performance is assured even in case of extreme fires.

It is useful in large fires like forest and coal mines and can save precious natural resource worth billions of dollars nationally and internationally.

It considerably reduces the logistic issues i.e. even less quantity of present composition produce phenomenal results thereby reducing number of vehicles required to reach the fire spot, in turn overcoming issues of traffic, manpower and vehicles used to fight a big fire. In addition, it reduces tank storages required in any building for fire fighting requirements, reduces pipe size to carry water in hydrants to all floor, reduce pumping of water and reduces power requirements.

It makes fire fighting possible with semi trained personal and also reduces risk of fire injuries, loss of life and property.

It reduces damage to assets.

It can easily reach to large areas as the composite A is very light and hence can help gain speed in controlling fires.

It can instantly arrest fire thus eliminates stress and fatigue to the fire fighters.

It is light in weight and does not require filling with very high pressures and thus the extinguishers filled with it are light in weight and easy to carry.

It is cost effective.

The composite is not viscous and is easy to clean after use.

It is Neutral having 7.1 pH.

It does not release bad odour in presence of high temperature fire.

It does not contain any carcinogens.

Extinguishing fire using the present invention requires limited fire tenders, manpower and other resources.

Due to enhance performance, less amount of extinguishant is required.

It is easy to carry and use with existing tools and technology. It is also possible to spray or release the composition from air tractors (helicopters, planes) or drones.

The invention claimed is:

1. A wet composition for extinguishing fires, comprising:
a composite material comprising a synthetic hydrated calcium silicate; and
water, wherein the wet composition comprises 2% w/v to 18% w/v of the composite material in the water, the composite material has a particle size ranging from greater than zero µm to 72 µm and the synthetic hydrated calcium silicate has a density ranging from 60 kg/m$^3$ to 450 kg/m$^3$.

2. The wet composition of claim 1, wherein the synthetic hydrated calcium silicate has a density ranging from 90 kg/m$^3$ to 400 kg/m$^3$.

3. The wet composition of claim 1, wherein the synthetic hydrated calcium silicate comprises tobermorite, xonotlite, and wollastonite.

4. The wet composition of claim 1, wherein the water is deionized water.

5. The wet composition of claim 1, wherein the composite material further comprises e-glass fiber in an amount ranging from 4% to 7%.

6. The wet composition of claim 1, consisting of:
the composite material; and
the water, wherein the composite material consists of the synthetic hydrated calcium silicate and, optionally, e-glass fiber in an amount ranging from 4 to 7%.

7. A dry composition for extinguishing fires, comprising:
a composite material comprising a synthetic hydrated calcium silicate; and
water, wherein the dry composition comprises the composite material and the water at a ratio of 82% to 98% composite material:18% to 2% water, the composite material has a particle size ranging from greater than zero µm to 72 µm, and the synthetic hydrated calcium silicate has a density ranging from 60 kg/m$^3$ to 450 kg/m$^3$.

8. The dry composition of claim 7, wherein the synthetic hydrated calcium silicate has a density ranging from 90 kg/m$^3$ to 400 kg/m$^3$.

9. The dry composition of claim 7, wherein the synthetic hydrated calcium silicate comprises tobermorite, xonotlite, and wollastonite.

10. The dry composition of claim 7, wherein the water is deionized water.

11. The dry composition of claim 7, wherein the composite material further comprises e-glass fiber in an amount ranging from 4% to 7%.

12. The dry composition of claim 7, consisting of:
the composite material; and
the water, wherein the composite material consists of the synthetic hydrated calcium silicate and, optionally, e-glass fiber in an amount ranging from 4% to 7%.

\* \* \* \* \*